United States Patent [19]

Pearson

[11] 4,390,991
[45] Jun. 28, 1983

[54] ADAPTIVE LASER OUTPUT COUPLER

[75] Inventor: James E. Pearson, North Palm Beach, Fla.

[73] Assignee: United Technologies Corporation, Hartford, Conn.

[21] Appl. No.: 251,679

[22] Filed: Apr. 6, 1981

[51] Int. Cl.³ .............................................. H01S 3/08
[52] U.S. Cl. ....................................... 372/21; 372/19; 372/98
[58] Field of Search .................. 350/157; 372/108, 98, 372/19, 21

[56] References Cited

U.S. PATENT DOCUMENTS 3,700,307  10/1972  Glenn ................................. 350/403

OTHER PUBLICATIONS

"16 μm Generation Form Phase-Matched 4 wave mixing of $CO_2$ and $NH_3$ Laser Radiation in Germanium"; Harrison et al.; *Opt. Comm.* vol. 27 No. 4; Oct.'78.

"Non-Collinear Phase Matched 4-Wave Mixing of $CO_2$ and $NH_3$ Laser Radiation in Germanium"; Harrison et al.; *Opt. Comm.* vol. 26, No 3; Sep.'78.

"Amplified Reflection, Phase Conjugation and Oscillation in Degenerate Four-Wave Mixing"; Yarn et al.; *Opt. Lett.* vol. No. 1, Jul.'77.

*Primary Examiner*—William L. Sikes
*Assistant Examiner*—Léon Scott, Jr.
*Attorney, Agent, or Firm*—Eric W. Petraske

[57] ABSTRACT

An output coupler for a high power laser employs the nonlinear effect of the 4-wave mixing process. The coupler adapts so that the coupling efficiency is dependent on the amplitude of the circulating fields within the optical cavity.

4 Claims, 3 Drawing Figures

ADAPTIVE LASER OUTPUT COUPLER

DESCRIPTION

1. Technical Field

The field of the invention is the coupling out of optical radiation from a laser cavity.

2. Background Art

An article by John Auyeung, et al. in the IEEE Journal of Quantum Electronics, Vol. QE-15, No. 10, October 1979, pg. 1180 discloses a phase conjugate mirror employing the nonlinear 4-wave mixing process. This phase conjugate mirror forms one boundary of an optical cavity of a ruby laser and was measured to have a reflectivity of approximately 100%. In this nonlinear 4-wave mixing process, two strong pump beams having amplitudes $A_1$ and $A_2$ effectively set up a holographic diffraction grating within an optical medium having a large nonlinear polarization coupling constant. A weak signal beam having amplitude $A_3$ injected into the nonlinear optical medium results in the establishment of a nonlinear polarization at a frequency $\omega_4 = \omega_1 + \omega_2 - \omega_3$. The amplitude of this nonlinear polarization is proportional to the product of $\chi$, the nonlinear coupling constant, and the amplitudes $A_1$, $A_2$, $A_3$ of the three beams.

Disclosure of Invention

The invention relates to a coupling device for an optical laser in which the nonlinear 4-wave mixing process is employed to provide a coupling device having the property of adapting the outcoupled power to the circulating power within the optical cavity, thus automatically coupling out the incremental added energy. The coupler may be employed with pulsed, Q-switched, mode-locked and cw lasers.

BEST MODE FOR CARRYING OUT THE INVENTION

Figure 1:
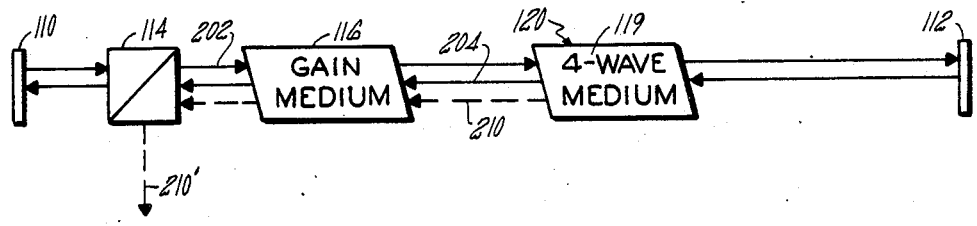
FIG. 1 illustrates a simplified embodiment of the invention adapted for a cw operation.

In FIG. 1, a laser including an embodiment of the invention comprises highly reflecting mirrors 110 and 112 that bracket an optical cavity, gain medium 116, polarization prism 114 and adaptive coupler 120, which includes nonlinear 4-wave medium 119 such as $SF_6$, $CS_2$, Ge or a number of other media. Before medium 119 is added to vessel 120, intracavity power circulates between mirrors 110 and 112 as indicated on lines 202 and 204. The magnitude of the circulating power will increase until various losses from the cavity balance the energy gained in each pass. When medium 119 is added to coupler 120, a new loss mode is added to those previously existing. In this embodiment, beams 202 and 204 form both the pump and the signal beams and together form a nonlinear polarization that is proportional to the third order nonlinear coupling constant, $\chi$, and to the cube of the amplitude of the circulating fields (neglecting beam depletion). This nonlinear polarization in turn generates beam 210 traveling in opposite direction to beam 202 and having orthogonal polarization. Gain medium 116 and coupler 112 both have Brewster angle windows as illustrated in the figure, so that the circulating power is polarized in the plane of the drawing. The output coupled power contained in beam 210 is thus polarized perpendicular to the plane of the drawing. The magnitude of the outcoupled power depends on the length of 4-wave medium 119 and on a factor that includes the third order nonlinear coupling constant and the amplitudes of the two pump beams. It has been shown by Yariv and Pepper in Optics Letters, Vol. 1, July 1977, that the amplitude of the outcoupled electric field can be as great as the amplitude of the signal field. Outcoupled beam 210 passes back through gain medium 116 and is deflected out of the cavity by polarizer 114 which is a conventional polarizing prism that passes radiation polarized in the plane of the drawing and deflects by 90° radiation polarized perpendicular to the plane of the drawing.

An advantageous feature of the placing of coupler 120 and polarizing prism 114 within the optical cavity is that the well known time reversal property of the phase conjugate radiation serves to compensate for distortions introduced by the mirrors, gain media and coupler within the optical cavity, so that beam 210 as it passes out of medium 116, is substantially compensated for various distortions introduced by these media, and beam 210' exiting from the optical cavity has higher optical quality than the beam circulating within the cavity.

Neglecting attenuation losses within the cavity, the amplitude of the electric field of beam 210 depends on the product of the electric field amplitude of beam 204 and the square of the beam 202 amplitude, and thus this cw laser is especially suited for high power applications.

Figure 2:
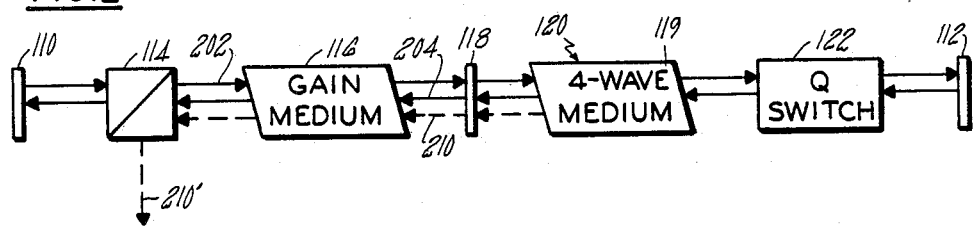
FIG. 2 illustrates an embodiment of the invention adapted for pulsed operation.

Pulsed lasers having low average power may nevertheless have high instantaneous electric fields during the pulse, and an embodiment of the invention suited for pulsed laser operation is illustrated in FIG. 2, in which phase retardation device 118 and Q-switch 122 have been added to the embodiment of FIG. 1. Q-switch 122 functions as in the prior art to set up mode-locked or Q-switched operation. An adjustable phase retardation device 118 is a convenience which is used in the absence of beam 210 to change the polarization of the right and left traveling waves. It both adjusts the polarization of the pump beams and can shift some of beam 210 to the non-outcoupled polarization state. Phase retardation device 118 may be used to initiate or optimize the reaction for those 4-wave media that require a particular combination of polarization states. It may also be used to fine tune the outcoupling process by shifting some of beam 210 back into the circulating polarization. Device 118 is not essential to the operation of the invention in its most general form.

Figure 3:
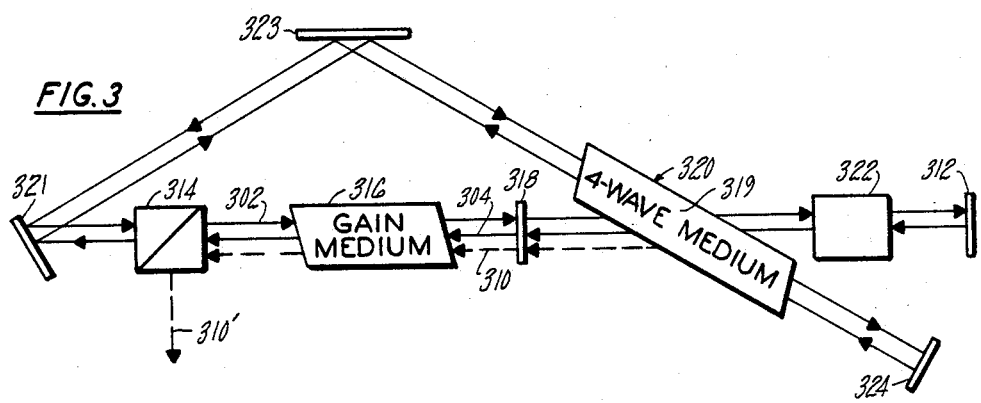
FIG. 3 illustrates an alternate embodiment of the invention.

In the case of pulsed operation, it is necessary to keep track of the timing and phase of the various circulating pulses within the cavity so that the necessary condition for 4-wave mixing, i.e. the simultaneous presence of two pump beams and a signal beam within medium 119, is satisfied. In the embodiment illustrated in FIG. 2, the signal beam and one of the pump beams are identical, as is the case in FIG. 1, thus reducing the possibilities of adjustment. In FIG. 3, an alternative embodiment of the device illustrated in FIG. 2 is shown, in which the pump beams and the signal beam travel by separate paths and thus may be adjusted in timing and phase. In this embodiment, the main cavity is defined by mirrors 321, 323, 324 and 312, and the spacing of the mirrors must be such that two pulses from the pump beams, i.e. those traveling between mirrors 323 and 324, are simultaneously present within gain medium 319 as is a signal pulse from beam 302. It is not necessary that a pulse from beam 304 be present in medium 319. Output beam 310 is then generated and coupled out of the cavity as before. Gain medium 316, phase retardation device 318, output coupler 320, nonlinear medium 319, Q-switch 322 and polarizer 314 are all similar to those elements with corresponding numbers in the previous figures. An advantageous feature of the embodiment of FIG. 3 is that the pump beams may be altered in polarization relative to the signal beam, either in device 318 or in additional devices. The laser configuration of FIG. 3 may also be used for cw operation, with the Q-switch removed or maintained in the transmitting condition.

A pulse traveling along path 302 through medium 319 serves as a signal beam, transferring a portion of its energy to beam 310. This portion must be less than 100% for the proper operation of the device, since the remaining portion of beam 302 is reflected from mirror 312, back through gain medium 316, off mirror 310 and forms, in sequence, both of the pump beams as it travels through medium 319 before and after reflection from mirror 324. It is thus essential for the proper operation of this device that the medium not transfer 100% of the signal power to the output beam, in contrast to the phase conjugate mirror illustrated in the article by Auyeung, et al., in which the authors successfully constructed a phase conjugate mirror having 100% transfer of power from a signal beam to an intracavity phase conjugate beam.

The operation of the adaptive process of the present device is illustrated in that the depleted signal beam forms the pump beams. Thus, excessive depletion of beam 302 on one pass results in a weaker pump beam on the next pass and thus in a weaker output coupling so that the outcoupling efficiency adapts within one round trip of the cavity to fluctuations in the gain medium or the phase conjugate medium.

I claim:

1. A laser having an optical cavity comprising a gain medium, reflective means defining an optical cavity about said gain medium for resonating optical radiation therein at a resonant power level and further comprising:

means for maintaining the polarization of a portion of said resonating optical radiation circulating within said cavity within a first polarization plane;

phase conjugate means, disposed intermediate said reflective means, for generating a phase conjugate beam having a variable power level and a second plane of polarization orthogonal to said first polarization plane, the ratio of said variable power level and said resonant power level being a function of said resonant power level; and means for coupling radiation in said second plane out of said cavity.

2. A laser according to claim 1, in which said phase conjugate means is pumped by a portion of said resonating radiation circulating within said cavity.

3. A laser according to claim 2, in which said circulating radiation is continuous wave.

4. A laser according to claim 2, in which said circulating radiation is pulsed.

* * * * *